Figure 4:
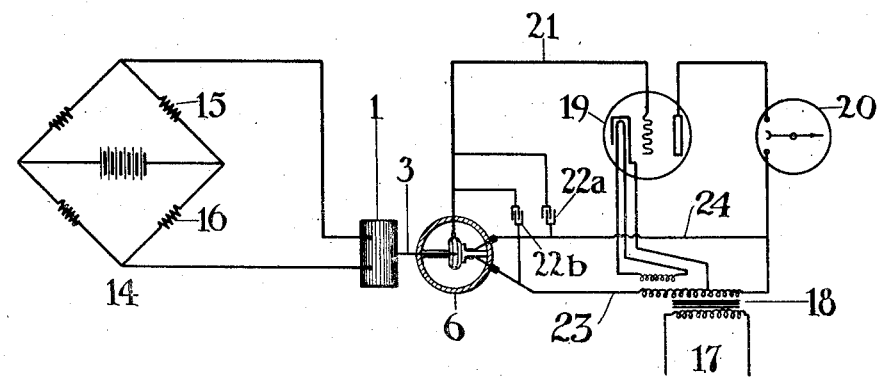

Feb. 26, 1935.　　S. L. HANDFORTH　　1,992,304
ELECTRICAL APPARATUS
Filed Dec. 23, 1931　　2 Sheets-Sheet 1
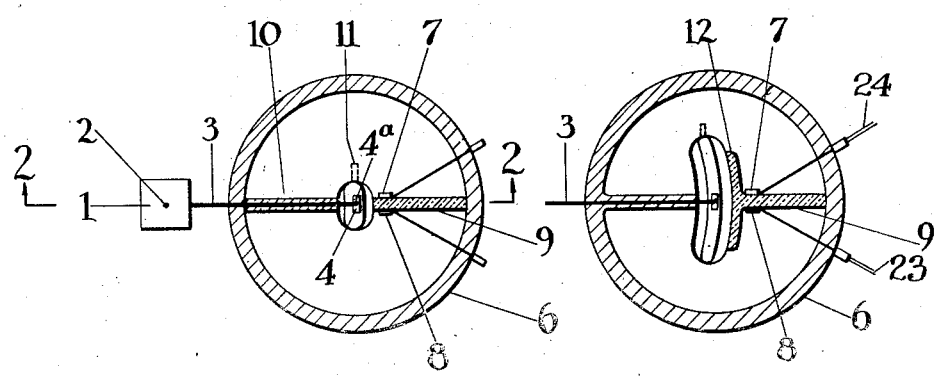
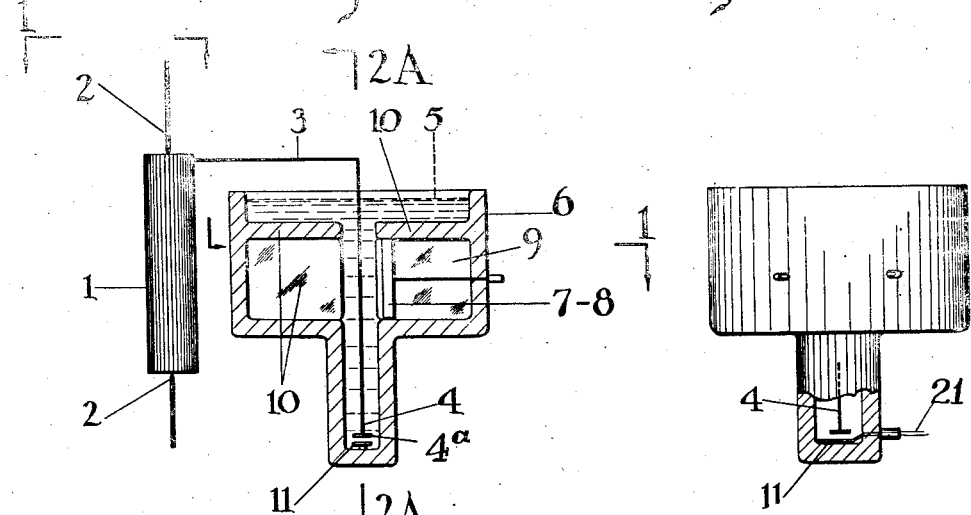
INVENTOR.
Stanley L. Handforth
BY
ATTORNEY.

Feb. 26, 1935. S. L. HANDFORTH 1,992,304
ELECTRICAL APPARATUS
Filed Dec. 23, 1931 2 Sheets-Sheet 2

INVENTOR.
Stanley L. Handforth
BY
ATTORNEY.

Patented Feb. 26, 1935

1,992,304

UNITED STATES PATENT OFFICE 1,992,304

ELECTRICAL APPARATUS

Stanley L. Handforth, Woodbury, N. J., assignor to E. I. du Pont de Nemours & Company, Wilmington, Del., a corporation of Delaware Application December 23, 1931, Serial No. 582,750

5 Claims. (Cl. 201—57)

This invention relates to a contactless relay for controlling electrical currents or equipment thereby from very feeble impulses. More particularly it relates to a method of amplifying weak electrical impulses so as to obtain therefrom relatively large electrical impulses to operate other equipment. Still more particularly it relates to an improved method for relaying and amplifying the small electrical impulses obtained in electrical measuring circuits so as to control relatively large electrical currents and equipment from said small impulses.

In many electrical measuring circuits, the electrical impulses obtainable are often so small that they can only be determined by means of very delicate instruments or galvanometers. The force available in such a galvanometer is so small that the movement of the element cannot be used to control other currents or mechanical means directly, even slight drafts of air being sufficient to overcome the electrical forces available. Heretofore, this disadvantage has been overcome to some extent by periodically clamping the moving element in the position to which it is moved by the actuating current and then controlling the operation of a relay mechanism by the amount of displacement of this element. Other attempts have been made to cause this moving element to make a delicate electrical contact and then amplify the resulting current. On account of the very small force available, this has proved unreliable and complicated.

An object of this invention is a method of utilizing the delicate movement which can be obtained from the measuring element in such electrical circuits or other elements for the control of relatively large electrical currents or mechanical forces. A still further object is a means of utilizing directly the movement of an element of an apparatus for the control of relatively large electrical currents and equipment. Other objects will appear as the description proceeds.

These objects are accomplished by means of a delicate moving element actuated by the electrical impulse derived from the measuring circuit or by other impulses, said moving element carrying an arm, the end of which dips into a suitable liquid bath or reservoir in which are placed adjacent to but not in contact therewith, the electrodes for controlling the voltage of relaying or amplifying means such as a three electrode vacuum tube or relay. This constitutes essentially a liquid potentiometer, the arm of the moving element being the moving arm of the potentiometer. The electromotive force as controlled by this potentiometer acts on the suitable relay mechanism consisting of either a delicate electromagnetic or electrostatic relay or preferably a three electrode vacuum or relay tube.

I have also found that while the moving element or arm may pass close to the electrodes or walls of the apparatus while under the liquid, it must not pass through the liquid surface adjacent to any other wall, or capillary attraction will be so great as to overcome the forces available in the moving element and will interfere with the operation. If the moving arm of such an element is placed near an electrode of different potential and particularly if an alternating potential is applied, there will be an electrostatic pull sufficient to overcome the forces available in the moving element. This difficulty has been overcome by placing the two electrodes of the potentiometer in line with the end of the moving arm so that any force is exerted in line with the moving arm and will not tend to deflect it. Also the two electrodes that represent the extreme ends of the potentiometer circuit are placed close together so that the electrostatic pull of one is neutralized by that of the other. These are separated by a very thin insulating partition such, for instance, as a thin layer of glass arranged in such a way that the path of the electric current through the liquid from one end electrode to the other passes around this partition in such relation to the line of movement of the moving element that the potential impressed on this element depends on the movement of the element in relation to the partition separating the two end electrodes of the liquid potentiometer. The arm of the moving element constitutes the moving arm or contact of the potentiometer and the potential picked up by this arm may be conducted out of the apparatus through the suspension of the moving element. However, in many cases, it is not desirable to do this as it is necessary to completely separate the two parts of the equipment electrically. This potential may, therefore, be conducted to a third electrode either in a second liquid bath or even in the same liquid bath by placing the third electrode in a position parallel with the movement at the end of the arm, so that it will always be in constant relation therewith, and at a sufficient distance from the two end electrodes of the potentiometer element so that the potential will be carried to it through the moving arm rather than directly through the liquid.

Figure 1 is a sectional plan view of one embodiment of the invention. Figure 2 is a sectional view in elevation of the device illustrated in Figure 1, and Figure 2A is a view of the same partially in section, but taken on an angle of 90° of the position shown in Figure 1. Figure 3 is a sectional plan view of a modification of the device of Figures 1 and 2, as will more fully be described hereinafter.

Figure 4A:
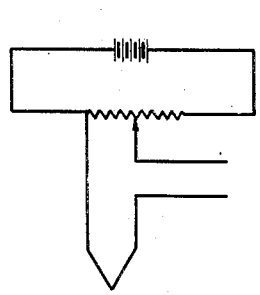
Figure 5:
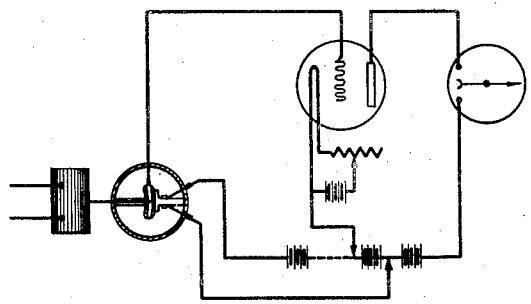

Figure 4 illustrates a measuring and relay circuit in which the element of Figures 1 to 3 may be advantageously included. Figure 4A illustrates a modified form of measuring circuit, while Figure 5 illustrates a modified form of relay circuit to those shown in Figure 4.

Referring particularly to Figures 1 and 2. 1 is the moving element of the actuating device, such as the moving coil of a galvanometer carried on delicate suspensions or pivots 2. The moving arm 3 of the element may be electrically connected to one of the suspensions of the moving element or may be completely insulated electrically therefrom. The end 4 of this moving element, or needle, dips in the liquid 5 carried in cup or cell 6. This moving element passes through the surface of the liquid at a sufficient distance from the walls of cell 6 so that there is essentially no capillary attraction between the element and the walls of the cell. The end electrodes 7 and 8 of the potentiometer arrangement are placed on either side of the thin glass partition 9 so close to each other that any electrostatic pull on one of them, which might be exerted on the moving element 4, is practically neutralized by the other and what little pull remains is in such a direction on the moving element that it exerts no deflecting force. The partitions 10 in the cell confine the path of the electric current from one of these electrodes to the other to the narrow space in which moving element 4 is placed. Thus if moving element 4 moves forward as shown in Figure 1, it will assume a potential more nearly that of electrode 8 than of electrode 7, whereas if it moved backward as shown in Figure 1, it will assume a potential more nearly that of electrode 7 than of electrode 8. If desired this moving element 3—4 may be electrically connected to one of the supports 2 of the moving element 1 and the potential impressed on element 4 carried by this means to the relaying device. However, as pointed out it is often more desirable to electrically insulate element 3 from elements 1 and 2. In this case, the additional well on the bottom of the cell as shown in Figure 2 is necessary. As shown in Figures 1 and 2, the third fixed electrode 11 is placed in a narrow extension of the main cell and moving element 4 is made sufficiently long to come close to this electrode. In this way, potential impressed on this element is conducted again through the liquid to the third electrode 11 and then to the relay. Electrode 11 is placed sufficiently far away from electrodes 7 and 8 in a narrow section of the cell so that the potential will be carried on it through element 4 rather than directly through the liquid, since element 4 is of a material of high conductivity, whereas the liquid 5 is of relatively low conductivity. If desired, the narrow extension of the cell carrying electrode 11 may be omitted and electrode 11 be placed in a separate cell with an additional projection similar to 4 from element 3 coming in close relation to it. However, the arrangement as shown is the preferred embodiment of this phase of the invention.

In Figures 1 and 2 the end of the partition 9 adjacent to the moving element 4 is relatively narrow, so that a very slight movement of the element 4 results in a relatively large change in the potential applied to 4. With suitable relay equipment, this will result in trigger-like or relay action. If it is desired to have more graduated action, depending on the relative position of elements 3 and 4, this may be obtained by making a broad face on the end of the partition 9 as shown at 12 in Figure 3. While the end electrodes of the potentiometer arrangement are relatively close together so as to neutralize the electrostatic pull, the path of the electric current through the liquid is relatively long so that there is a gradual change in the potential acting on 4 as it moves from a forward to a backward position.

While only an open top cell has been shown, it will be apparent that this may be closed above the surface of the liquid to an opening only large enough for the arm to pass through so as to reduce evaporation and loss of liquid. It is also possible to make the cell as part of a case completely enclosing the moving element and arm so as to entirely close the cell and case and prevent loss of liquid.

In a liquid potentiometer of this type a liquid has to be used which will have a constant resistivity, neither too high nor too low, and be of low viscosity. It is also desirable to have a liquid of low specific dielectric strength. While pure water may be used, I have found it relatively unsatisfactory as it quickly dissolves impurities with the result that the resistivity becomes so low that a high current passes through the liquid causing heating and loss. Most of the organic liquids are so high in resistivity that they are unsatisfactory. I have found some of these, however, to be satisfactory for use, but have found it still more desirable to use binary or ternary mixtures of some of these liquids. Certain of the alcohols and amines in particular are extremely suitable and particularly mixtures of the halogenated alcohols and some of the esters. For instance, orthotoluidine or dichlorhydrin may be used. Solutions of organic salts in nitrobenzene, for instance, are possible liquids. I have found, however, that ternary mixtures of esters, alcohols and halogen substituted alcohols are the most suitable. For example, a mixture of amyl acetate, amyl alcohol and dichlorhydrin has been found extremely suitable. It has low viscosity so as not to interfere with the motion of the measuring element, has low vapor pressure so that it does not evaporate from the apparatus rapidly, has a suitable conductivity for use with a three electrode vacuum or relay tube, and has a low specific dielectric value so that the electrostatic pull on the moving element is practically eliminated by its use.

Figures 4, 4A and 5 illustrate in principle some of the electrical circuits which may be used in conjunction with this type of relay control. For example, in Figure 4, 14 is a conventional Wheatstone bridge arrangement for measuring electrical resistance in which 15 may be the unknown and 16 the standard resistance. 1 is the galvanometer or moving element of the measuring device corresponding to the element designated 1 in the previous figures. 17 is a source of standard alternating current, 18 a transformer to supply the necessary voltages for operating the relay device 19 and other equipment. 19 is a three electrode vacuum relay tube or if large currents are to be handled, a tube of the Thyratron type may be used. 20 is either the mechanical device or other indicator which is to be operated by the relaying equipment. The control grid 21 of the relaying tube is connected to electrode 11 of the potentiometer. Electrodes 7 and 8 are connected to opposite ends of the transformer, supplying current to the tube and equipment while the cathode of the tube is connected to some intermediate point of said transformer. Thus if the moving element 3 moves backward toward electrode 7, it will assume a potential nearly corresponding to that of electrode 7 on the plate side of the vacuum tube. This will allow the vacuum tube to pass an increased amount of current thus actuating device 20. On the other hand, if element 3 moves forward, it will cause a potential more nearly that of electrode 8 to be impressed on grid 21 of the relaying tube, which will reduce the amount of current passing through the device 20. By using a Thyratron type of tube and a cell as shown in Figures 1 and 2, a very sensitive snap action or relay action will be obtained. This action may be modified by condensers 22a or b so as to obtain the desired degree of sensitivity. If an ordinary 3 electrode vacuum tube and a cell similar to that shown in Figure 3 are used, a graduated action will be obtained, and a gradual increase or decrease of current through the tube and device 20 will result.

In place of the simple Wheatstone bridge circuit as shown at 14, a potentiometer circuit as shown at 4A may be substituted such as that used in connection with determining temperatures by means of thermocouples. While only the simple circuits have been shown, it will be apparent that the more complicated circuits used for these purposes are equally applicable. While electric measuring circuits have been shown as the initiating force on moving element 3, and this has been shown as being the moving coil 1 of an instrument such as a galvanometer, this element 3 may be moved mechanically by means of the force applied by some other type of apparatus such as the expansion of some thermal element or the like. Figure 5 shows a relay circuit in which direct current instead of alternating current is used. In this case, the circuit may be very similar and a battery may be used in place of the transformer 18, though it will be apparent from the foregoing that many other circuits may be used.

While only the principles of the operation of this apparatus have been illustrated, they have numerous commercial applications. For instance, the arrangement of Figure 4 may be used in a resistance testing apparatus in which case the electrical resistance of the part to be measured is determined by the regular Wheatstone bridge method as shown at 14 Figure 4. Movement of the galvanometer needle 3—4 can then be used to actuate the relay mechanism and apparatus 20, which can be a sorting apparatus. A temperature measuring circuit may be substituted in place of 14 and the apparatus 20 may then be a heater or cooler, in which case, constant temperature may be maintained by this means. Recording type potentiometers are used a great deal and mechanical means are necessary for relaying the delicate movement of the measuring galvanometer so as to move the rebalancing mechanism of the potentiometer or recorder. By utilizing the arrangement shown in Figure 4, 20 may be the necessary device controlling the movement of the balancing potentiometer. On the other hand, 20 may be the potentiometer circuit itself in which case it will be made entirely self-balancing without the mechanical means. This is particularly applicable in such devices as the hot wire anemometer. There are obviously many modifications of the principle and devices of this invention and innumerable applications thereof. Therefore, it will be apparent that many embodiments exist and may be practiced within the scope of my invention and that I do not intend to be limited to the foregoing examples, or embodiments except as indicated in the following patent claims.

I claim:

1. A liquid potentiometer comprising a liquid resistance bath, a pair of closely adjacent electrodes of differing potentials in said bath, an insulating partition extending into said bath between said electrodes to confine the electrical current between said electrodes to a circuitous path around the end of said partition and through said bath, and an actuated potential-receiving and conducting electrode in said bath mounted for travel in the bath and along a substantial portion of said circuitous path.

2. A liquid potentiometer comprising a liquid resistance bath, a pair of closely adjacent electrodes of differing potentials in said bath, an insulating partition extending into said bath between said electrodes to confine the electrical current between said electrodes to a circuitous path around the end of said partition and through said bath, and an actuated potential-receiving and conducting electrode in said bath mounted for travel in the bath and along a substantial portion of said circuitous path, said electrode being in the character of an oscillating arm with its end in said bath, and said pair of electrodes being arranged in substantially the same plane with the end of said arm and in line therewith, whereby any electrostatic pull exerted on said arm by said electrodes will be ineffective to deflect the same.

3. A liquid potentiometer comprising a container, a liquid resistance bath in said container, a pair of closely adjacent electrodes of differing potentials in said bath, an insulating partition extending into said bath between said electrodes to confine the electrical current between said electrodes to a circuitous path around the end of said partition and through said bath, an actuated potential-receiving and conducting electrode arranged in part above said bath and having a portion extending from said part into the bath for travel in the bath and along a substantial portion of said circuitous path, the said portion of said electrode which extends into the bath being, at the surface of the bath, so far spaced from the walls of said container as to render capillary attraction negligible.

4. A liquid potentiometer comprising a liquid resistance bath, a pair of closely adjacent electrodes of differing potentials in said bath, an insulating partition extending into said bath between said electrodes to confine the electrical current between said electrodes to a circuitous path around the end of said partition and through said bath, an actuated potential-receiving electrode in said bath mounted for travel in the bath and along a substantial portion of said circuitous path and another potential-delivering electrode in said bath and spaced away electrically from said circuitous current path, said actuated electrode being arranged close to and in relatively constant electrical relation to said other electrode, and being electrically transmissive in character, thereby adapting it for transmitting to said other electrode, the potential impressed on the actuated electrode.

5. A liquid potentiometer comprising a container, a liquid resistance bath in said container, a pair of closely adjacent electrodes of differing potentials in said bath, an insulating partition extending into said bath between said electrodes to confine the electrical current between said electrodes to a circuitous path around the end of said partition and through said bath, an actuated potential-receiving electrode arranged in part above said bath and having a portion extending from said part into the bath for travel in the bath and along a substantial portion of said circuitous path, the said portion of said electrode which extends into the bath being, at the surface of the bath, so far spaced from the walls of said container as to render capillary attraction negligible, said electrode being in the character of an oscillating arm with its end in said bath, and said pair of electrodes being arranged in substantially the same plane with the end of said arm and in line therewith, whereby any electrostatic pull exerted on said arm by said electrodes will be ineffective to deflect the same, and another potential-delivering electrode in said bath and spaced away electrically from said circuitous current path, said actuated electrode being arranged close to and in relatively constant electrical relation to said other electrode, and being electrically transmissive in character, thereby adapting it for transmitting to said other electrode, the potential impressed on the actuated electrode.

STANLEY L. HANDFORTH.